(12) United States Patent
Muramatsu

(10) Patent No.: US 6,739,441 B2
(45) Date of Patent: May 25, 2004

(54) RATCHET ONE-WAY CLUTCH AND STATOR USING RATCHET ONE-WAY CLUTCH

(75) Inventor: Kazuhiko Muramatsu, Fukuroi (JP)

(73) Assignee: NSK-Warner K.K., Tokyo (JP)

( * ) Notice: Subject to any disclaimer, the term of this patent is extended or adjusted under 35 U.S.C. 154(b) by 0 days.

(21) Appl. No.: 10/195,382

(22) Filed: Jul. 16, 2002

(65) Prior Publication Data

US 2003/0015390 A1 Jan. 23, 2003

(30) Foreign Application Priority Data

Jul. 17, 2001 (JP) .................................... 2001-216686

(51) Int. Cl.[7] .............................................. F16H 41/24
(52) U.S. Cl. ........................... 192/46; 60/345; 192/212
(58) Field of Search ...................... 192/46, 45.1, 3.34, 192/41 R, 30 V, 207, 212, 113.32; 60/345

(56) References Cited

U.S. PATENT DOCUMENTS

| | | | | | |
|---|---|---|---|---|---|
| 1,935,459 A | * | 11/1933 | Ryan et al. | ................. | 192/212 |
| 1,939,226 A | * | 12/1933 | RAuen | ..................... | 192/41 R |
| 2,101,297 A | * | 12/1937 | Swennes | ..................... | 192/212 |
| 2,284,278 A | * | 5/1942 | Goodwin | .................... | 192/212 |
| 4,620,621 A | * | 11/1986 | Kulczycki et al. | ........... | 192/212 |
| 4,789,375 A | * | 12/1988 | Bassett | ....................... | 192/212 |
| 5,242,328 A | * | 9/1993 | Friedmann et al. | ......... | 192/212 |
| 5,690,202 A | * | 11/1997 | Myers | .......................... | 192/46 |
| 6,575,275 B2 | * | 6/2003 | Muramatsu et al. | ........... | 192/46 |

* cited by examiner

Primary Examiner—Rodney H. Bonck
(74) Attorney, Agent, or Firm—Miles & Stockbridge P.C.

(57) ABSTRACT

The present invention provides a ratchet one-way clutch comprising inner and outer races disposed on a same axis and in which a pawl member as a torque transmitting member and a biasing member for biasing the pawl member are provided in one of the inner and outer races and a recessed portion into which the pawl member is fitted is provided in the other of the inner and outer races and a damper spring is provided on an outer periphery of the outer race and wherein an inner surface of a spring pocket for containing the damper spring has a shape complementary to a shape of the damper spring.

8 Claims, 4 Drawing Sheets

RATCHET ONE-WAY CLUTCH AND STATOR USING RATCHET ONE-WAY CLUTCH

BACKGROUND OF THE INVENTION

1. Field of the Invention

The present invention relates to a ratchet one-way clutch using ratchets (pawls) as a locking mechanism among one-way clutches used in a transmission for motor vehicles, farm machines, building machines, industrial machines and the like and having a back stop function, particularly a transmission for vehicles, and a stator for a torque converter using such a ratchet one-way clutch.

2. Related Background Art

In general, a one-way clutch used in an automatic transmission has outer and inner races which are rotated relative to each other, and sprags or rollers for transmitting torque between the outer race and the inner race are engaged by a track surface of the outer race or the inner race so that rotational torque is transmitted only in one direction. Further, the clutch is idly rotated in an opposite direction.

Among such one-way clutches, there is a ratchet one-way clutch in which a ratchet is used as a torque transmitting member for transmitting torque between the outer race and the inner race. The ratchet one-way clutch is constituted by an outer race provided at its inner periphery with pockets, an inner race disposed in coaxial with the outer race and provided at its outer periphery with notches, pawl members disposed within the pockets and adapted to be fitted into the notches of the inner race to establish a lock-up condition of the one-way clutch in which torque can be transmitted between the inner race and the outer race, and elastic members for biasing the pawl members towards the inner race.

In the ratchet one-way clutch having the above-mentioned arrangement, when the one-way clutch is rotated in one direction, since the pawl members are slid freely with respect to an outer periphery of the inner race, the outer race and the inner race are rotated idly relative to each other. If the one-way clutch tries to rotate in an opposite direction, the pawl members are fitted into the notches, thereby establishing the lock-up condition of the one-way clutch.

In recent years, development regarding compactness, light-weighting and cost reduction of parts of a motor vehicle such as a transmission has widely been effected, and the one-way clutch is also included in such interest. In order to meet such request, use of the ratchet one-way clutch has been proposed.

Generally, in the ratchet one-way clutch, recessed portions formed in the inner race or the outer race engage the pawl members, thereby transmitting the torque. In order to absorb shock generated by fitting the pawl members into the recessed portions, damper springs are provided on an outer periphery of the outer race.

Although the damper springs which are normally coil springs are contained in pockets provided in the outer periphery of the outer race, since the shape of the pocket differs from that of the damper spring, the holding ability and operation reliability of the spring are not always satisfied.

Further, due to the difference between the shape of the damper spring and that of the pocket, a part of the damper spring is slidingly contacted with an inner wall of the pocket, thereby generating local wear.

SUMMARY OF THE INVENTION

Accordingly, an object of the present invention is to provide a ratchet one-way clutch which can achieve a holding ability and operating stability of a damper spring and can prevent local wear of the damper spring.

To achieve the above object, the present invention provides a ratchet one-way clutch comprising inner and outer races disposed on a same axis and in which a pawl member as a torque transmitting member and a biasing member for biasing the pawl member are provided in one of the inner and outer races and a recessed portion into which the pawl member is fitted is provided in the other of the inner and outer races and a damper spring is provided on an outer periphery of the outer race and wherein an inner surface of a spring pocket for containing the damper spring has a shape complementary to a shape of the damper spring.

In the present invention, since the inner surface of the spring pocket for containing the damper spring has the shape complementary to the shape of the damper spring, a holding ability and operating stability of the damper spring are enhanced.

Further, due to the difference between the shape of the damper spring and that of the pocket, the part of the damper spring was slidingly contacted with the inner wall of the pocket particularly, thereby generating local wear. However, in the present invention, by adopting complementary shape arrangement, wear can be prevented.

DETAILED DESCRIPTION OF THE PREFERRED EMBODIMENTS

Figure 1:
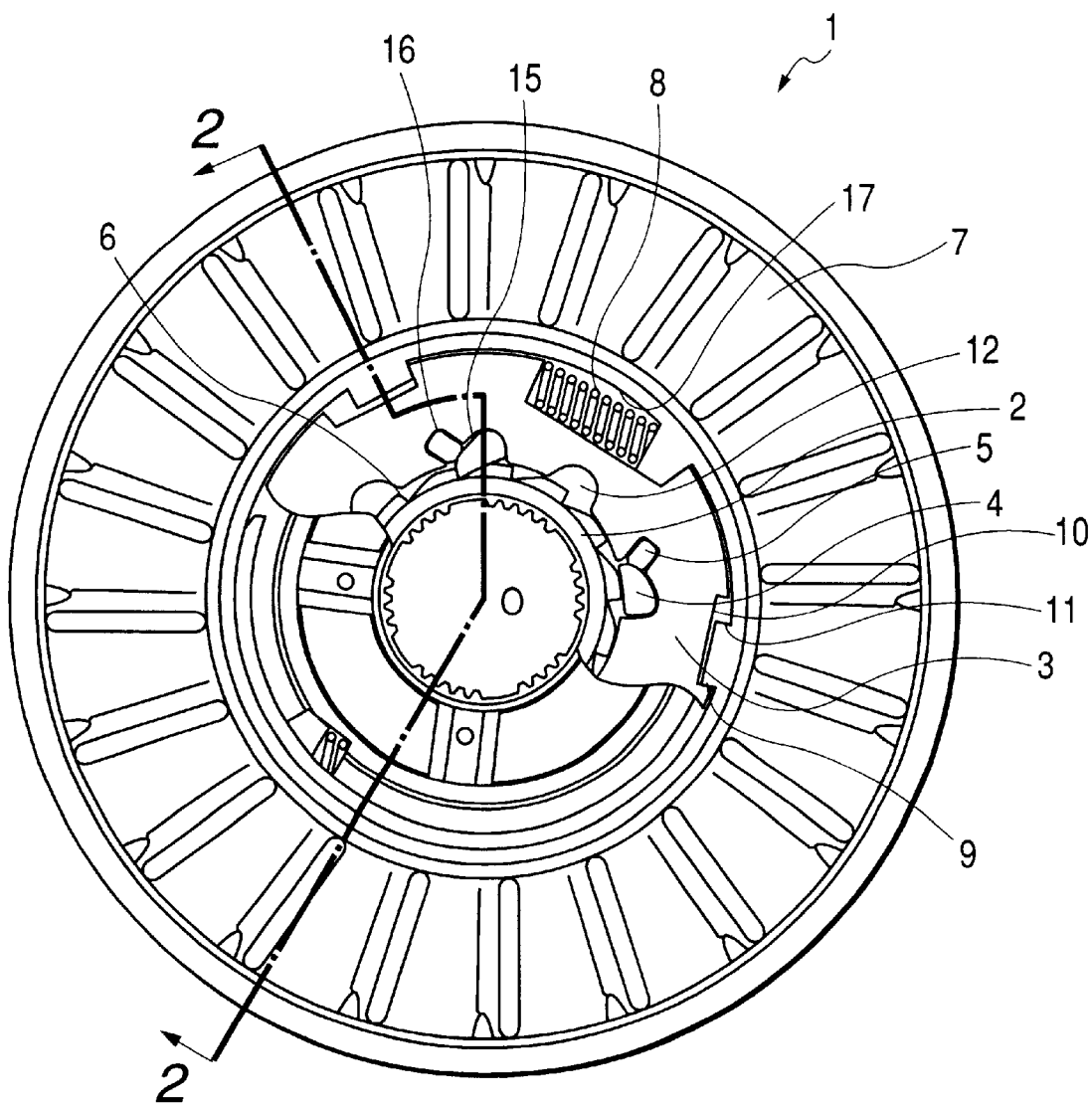
FIG. 1 is a front (partial sectional) view of a stator using a ratchet one-way clutch according to the present invention.

The present invention will now be fully explained in connection with embodiments thereof with reference to the accompanying drawings. Incidentally, in the drawings, the same elements are designated by the same reference numerals. Further, although the present invention is explained in connection with various embodiments, it should be noted that the present invention is not limited to such embodiments.

Figure 2:
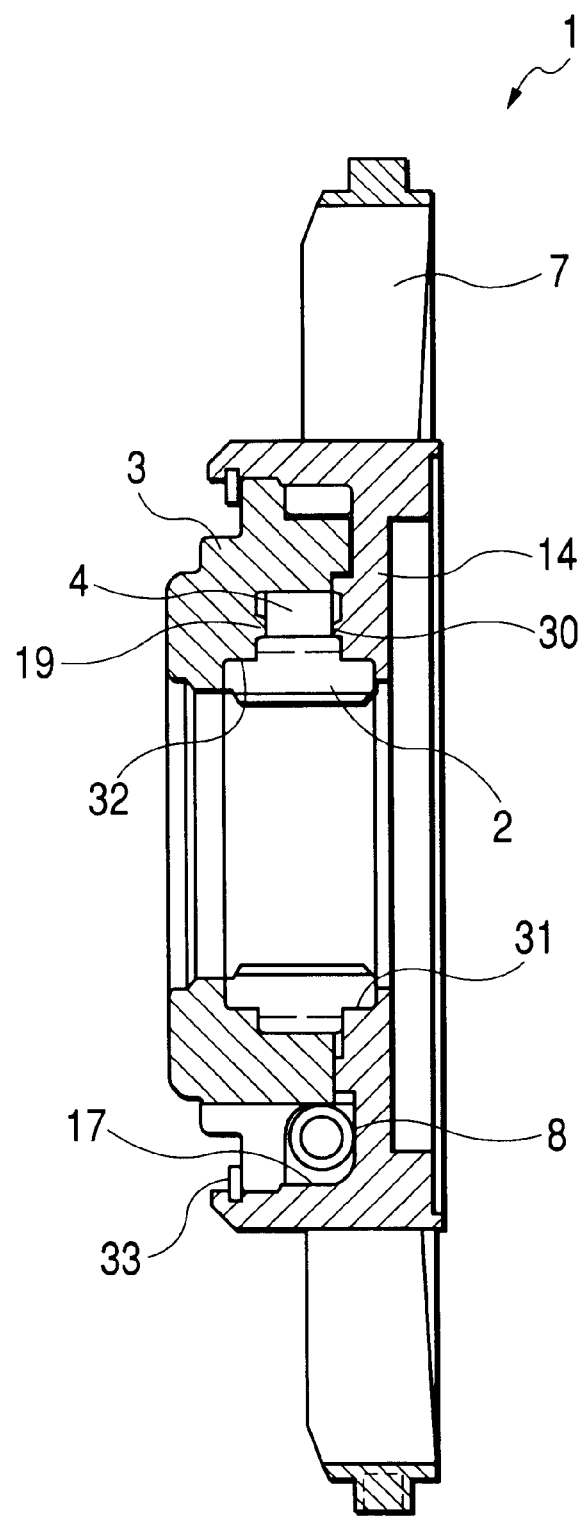
FIG. 2 is a sectional view taken along the line 2—2 in FIG. 1.

FIG. 1 is a front (partial sectional) view of a stator for a torque converter, using a ratchet one-way clutch according to the present invention, and FIG. 2 is a sectional view taken along the line 2—2 in FIG. 1. A stator 1 comprises an outer race 3 disposed in an inner periphery of a vane wheel 7, and an inner race 2 disposed coaxial with the outer race 3. First pockets 15 and second pockets 16 are formed in an inner periphery of the outer race 3, and a ratchet, i.e., a pawl member 4 is disposed within each first pocket 15 and an accordion spring 5 for biasing the pawl member 4 obliquely in a radial direction is disposed in each second pocket 16. On the other hand, recessed portions 6 into which the pawl members 4 are fitted are formed in an outer periphery of the inner race 2.

An inner peripheral flange portion, i.e., inner peripheral portion 14 of the vane wheel 7 contacts with an outer periphery and side surfaces of the outer race 3 to act as a bush and a bearing and supports the pawl members 4 and the accordion springs 5 in an axial direction. Further, for example, damper springs 8 that are coil springs are disposed between the inner peripheral portion 14 and the outer race 3. Incidentally, the accordion spring may be other spring such as a coil spring.

Protruded portions 9 are formed on the inner peripheral portion 14 and recessed portions 10 are formed in the outer periphery of the outer race 3 so that the recessed portions 10 cover the corresponding protruded portions 9 through gaps 11 and the damper springs 8 urge the protruded portions 9 against the corresponding recessed portions 10 at one side. With this arrangement, when the pawl members 4 are engaged by the recessed portions 6 in the outer periphery of the inner race 2, shock is absorbed by the damper springs 8. Further, by limiting a compressed range of the damper spring 8 by the engagement between the protruded portion 9 and the recessed portion 10, yielding and/or damage of the damper spring 8 can be prevented.

The damper springs 8 are disposed within spring pockets 17 defined between the outer race 3 and the vane wheel 7 of the stator 1. Although a plurality of spring pockets 17 are provided along the circumferential direction, the number of such pockets can appropriately be selected.

Incidentally, recessed portions as stress dispersing means 12 are provided in the inner periphery of the outer race 3 of the stator 1. The stress dispersing means 12 has a substantially semi-circular radial section and is defined by curved surface. As shown in FIG. 2, each pawl member 4 is held in the axial direction by a projection 30 protruded from the inner peripheral portion 14 of the vane wheel 7 and a projection 19 protruded from the outer race 3 and can be rocked between the projections 30 and 19. A part of the inner peripheral portion 14 is provided with a bearing portion 31 as a bearing for the inner race 2, and a part of the outer race 3 is provided with a bearing portion 32 as a bearing for the inner race 2. Further, a snap ring secured to the vane wheel 7 not to be shifted axially fixes the outer race 3.

Figure 3:
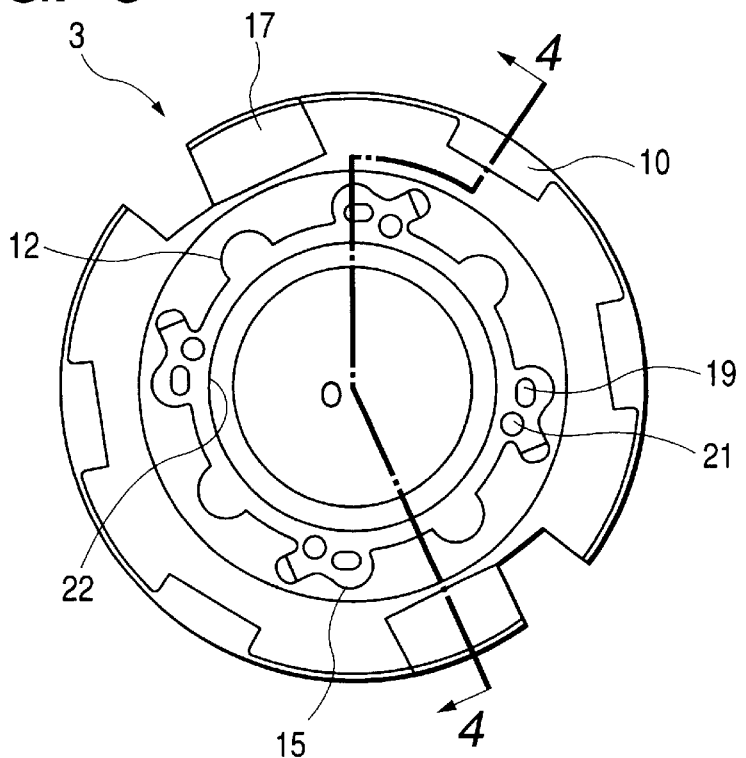
FIG. 3 is a front view of an outer race.
Figure 4:
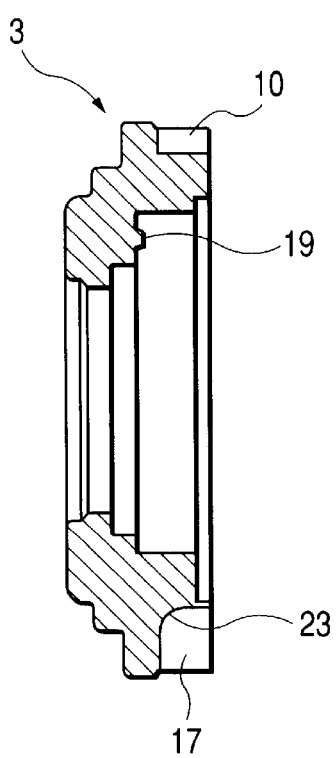
FIG. 4 is a sectional view taken along the line 4—4 in FIG. 3.

FIG. 3 is a front view of the outer race 3 of the ratchet one-way clutch and FIG. 4 is a sectional view taken along the line 4—4 in FIG. 3. Two diametrically opposed spring pockets 17 formed in the outer periphery of the outer race 3 to contain the damper springs 8 are provided. Further, two recessed portions 10 substantially equidistantly arranged along the circumferential direction are provided between the spring pockets 17.

The projection 19 protruded axially toward the pawl member 4 is formed on a side surface of the first pocket 15 of the outer race 3 for containing the pawl member 4. Further, a lubricating oil supplying through-hole 21 is provided in the vicinity of the projection 19. Lubricating oil from the lubricating oil supplying hole 21 lubricates the interior of the ratchet one-way clutch and further lubricates the bearing portion 31 and the bearing portion 32.

As shown in FIG. 4, in order to define the spring pocket 17 for containing and holding the damper spring 8, at least a part of a corner portion 23 formed on the outer race 3 is formed as a curved surface having an arc-shaped radial section. In consideration of the holding function for the damper spring 8, the corner portion 23 is preferably defined by an arc-shaped curved surface extending wholly around the circumferential direction. In order to prevent local wear due to offset contact, a curvature of the curved surface preferably coincides with the radial curvature of the damper spring 8 as the coil spring.

Figure 5:
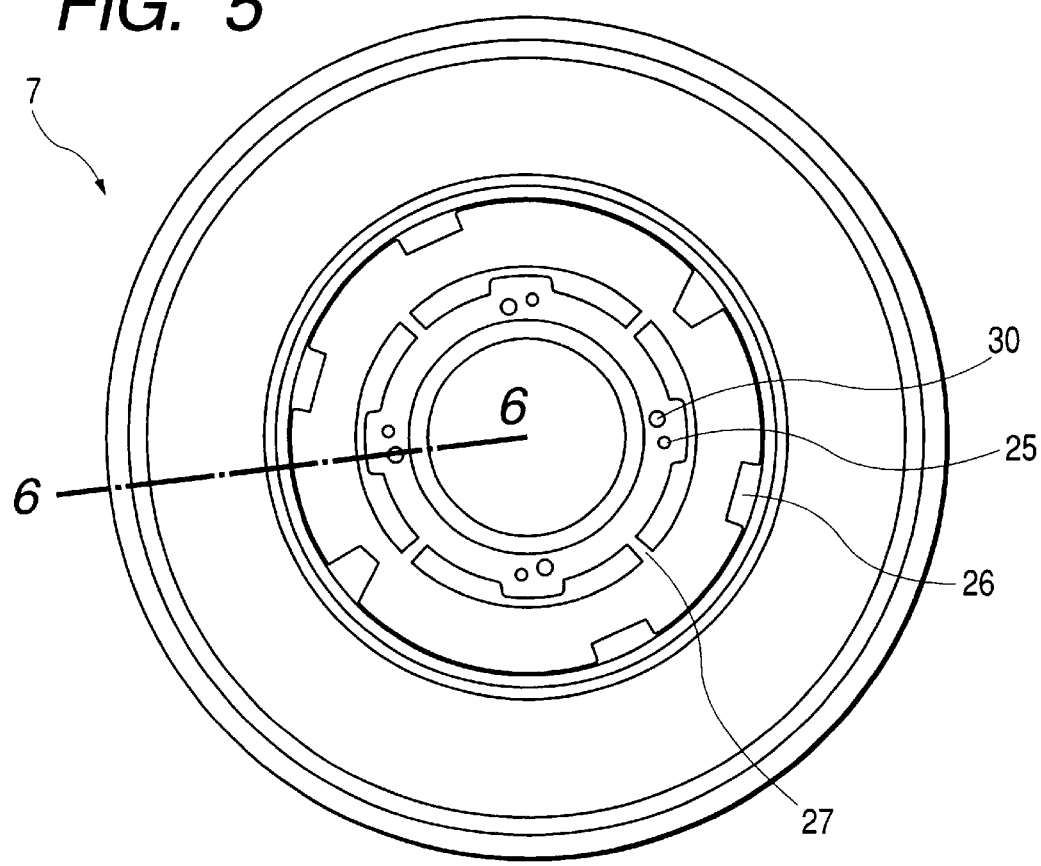
FIG. 5 is a front view of a vane wheel.
Figure 6:
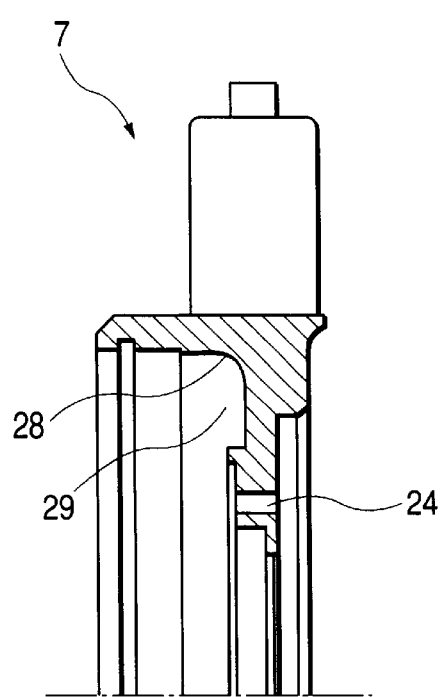
FIG. 6 is a sectional view taken along the line 6—6 in FIG. 5.

FIG. 5 is a front view of the vane wheel of the stator using the ratchet one-way clutch according to the present invention, and FIG. 6 is a sectional view taken along the line 6—6 in FIG. 5. The vane wheel 7 is provided with projections 30 extending axially in a confronting relationship to projections 19 provided on walls of the first pocket 15 of the outer race. Further, in the vicinity of the projection 30, there is provided a through-hole 25 disposed substantially in a confronting relationship to a lubricating oil supplying hole 21 provided in the outer race 3.

Protruded portions 26 provided on an inner periphery of the vane wheel 7 and extending radially inwardly are fitted in recessed portions 10 of the outer race 3, thereby limiting excessive rotation of the outer race 3. Further, there is provided a discharge groove 27 for discharging the lubricating oil. With this arrangement, the lubricating oil supplied from the lubricating oil supplying hole 21 to the ratchet one-way clutch lubricates the interior of the ratchet one-way clutch and lubricates the bearing portion 31 and the bearing portion 32, and foreign matters such as metal powder generated from sliding parts are conveyed by the lubricating oil and are discharged to the exterior through the through-hole 25 and the discharge groove 25.

As can be seen from FIG. 6, similar to the corner portion 23 of the outer race 3 of FIG. 4, at least a part of a corner portion 28 of a spring pocket 29 of the vane wheel 7 is formed as a curved surface having an arc-shaped radial section. In consideration of the holding function for the damper spring 8, the corner portion 28 is also preferably defined by an arc-shaped curved surface extending wholly around the circumferential direction. Further, in order to prevent local wear due to offset contact, a curvature of the curved surface preferably coincides with the radial curvature of the damper spring 8 as the coil spring.

Although the spring pocket for containing the damper spring 8 is defined between the outer race 3 and the vane wheel 7, it is preferable that the corner portions 23, 28 opposed diagonally are formed as the curved surfaces as mentioned above. It should be noted that, when a spring other than a coil spring is used as the damper spring 8, a complementary shape fitted to the shape of the spring is adopted.

In the above-mentioned embodiment of the present invention, the number of damper springs 8, spring pockets 17, 29 containing such damper springs and the number of protruded portions 9 and recessed portions 10 for limiting the rotation of the outer race 3 can be selected appropriately and are not limited to the illustrated numbers. Further, while an example that the recessed portions 6 that are engaged by the pawl members 4 are provided in the inner race 2 was explained, a reverse arrangement can be adopted. That is to say, the recessed portions may be provided in the outer race and the first and second pockets for containing the pawl portions may be provided in the inner race 2.

The above-mentioned ratchet one-way clutch and stator using such ratchet one-way clutch achieve the following effect.

Since the inner surface of the spring pocket for containing the damper spring has the shape complementary to the shape of the damper spring, the holding function and operating stability of the damper spring can be obtained and local wear of the damper spring can be prevented.

What is claimed is:

1. A ratchet one-way clutch comprising:
   inner and outer races disposed on a same axis,
   wherein a pawl member as a torque transmitting member and a biasing member biasing said pawl member are provided in one of said inner and outer races and a recessed portion into which said pawl member is fitted is provided in the other of said inner and outer races and a damper spring is provided on an outer periphery of said outer race, and further wherein said damper spring is a coil spring and a spring pocket containing said damper spring has an inner surface portion of a shape complementary to a shape of a circumferential portion of said damper spring, with a curvature of said circumferential portion of said coil spring being substantially equal to a curvature of said inner surface portion and said inner surface portion being substantially engaged with said circumferential portion of said damper spring.

2. A ratchet one-way clutch according to claim 1, wherein at least said inner surface portion of said spring pocket is formed as a curved surface having a substantially arc-shaped radial section.

3. A stator using a ratchet one-way clutch according to claim 2.

4. A stator according to claim 3, wherein said spring pocket is defined between said outer race and a vane wheel of said stator, and said inner surface portion is a part of an inner surface of said outer race or said vane wheel and is formed as a curved surface having a substantially arc-shaped radial section.

5. A stator according to claim 3, wherein said spring pocket is defined between said outer race and a vane wheel of said stator, each of said outer race and said vane wheel has a respective inner surface part formed as a curved surface having a substantially arc-shaped radial section, and said inner surface portion of said spring pocket includes at least one of said inner surface parts of said outer race and said vane wheel.

6. A stator using a ratchet one-way clutch according to claim 1.

7. A stator according to claim 6, wherein said spring pocket is defined between said outer race and a vane wheel of said stator, and said inner surface portion is a part of an inner surface of said outer race or said vane wheel and is formed as a curved surface having a substantially arc-shaped radial section.

8. A stator according to claim 6, wherein said spring pocket is defined between said outer race and a vane wheel of said stator, each of said outer race and said vane wheel has a respective inner surface part formed as a curved surface having a substantially arc-shaped radial section, and said inner surface portion of said spring pocket includes at least one of said inner surface parts of said outer race and said vane wheel.

* * * * *